(12) United States Patent
Hannewald et al.

(10) Patent No.: US 6,305,240 B1
(45) Date of Patent: Oct. 23, 2001

(54) VEHICLE PEDAL

(75) Inventors: Thomas Hannewald, Griesheim; Reinhard Zenker, Königstein, both of (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/464,611

(22) Filed: Dec. 15, 1999

(30) Foreign Application Priority Data

Dec. 18, 1998 (DE) ............................................. 198 58 698

(51) Int. Cl.[7] ...................................................... G05G 1/14
(52) U.S. Cl. ................................................................ 74/513
(58) Field of Search .................. 74/512–514, 560–562.5, 74/564, 478, 478.5, 473.16, 473.17; 123/399

(56) References Cited

U.S. PATENT DOCUMENTS

| | | | |
|---|---|---|---|
| 1,930,710 | * 10/1933 | Dodge et al. ........................... | 74/512 |
| 4,194,720 | * 3/1980 | Callaghan et al. ...................... | 74/512 |
| 4,528,590 | * 7/1985 | Bisacquino et al. .................... | 74/512 |
| 4,944,269 | * 7/1990 | Imoehl .................................... | 74/513 |
| 4,958,607 | * 9/1990 | Lundberg ................................ | 74/513 |
| 5,088,343 | * 2/1992 | Yokoyama .............................. | 74/512 |
| 5,133,225 | * 7/1992 | Lundberg et al. ...................... | 74/560 |
| 5,295,409 | * 3/1994 | Byram et al. ........................... | 74/512 |
| 5,529,296 | * 6/1996 | Kato et al. .............................. | 74/513 |
| 5,896,781 | * 4/1999 | Muller .................................... | 74/512 |

\* cited by examiner

*Primary Examiner*—David A. Bucci
*Assistant Examiner*—Chong H. Kim
(74) *Attorney, Agent, or Firm*—Martin A. Farber

(57) ABSTRACT

A vehicle pedal has a pedal bar (16) and a pedal shaft (18) which is connected to the latter in a rotationally fixed manner and on which bearing locations (28, 32) are arranged. Up until now, the pedal bar (16) has usually been pinned to the pedal shaft (18) with the aid of an aluminum block between the bearing locations. In order to reduce the installation outlay during the production of a gas-pedal module (10), it is proposed that the pedal bar (16) be integrally formed on the pedal shaft (18) to the side of the two bearing locations (28, 32). This simplifies the production of the pedal lever (14) and the installation of the latter in the bearing arrangement (28, 32).

4 Claims, 2 Drawing Sheets

VEHICLE PEDAL

FIELD AND BACKGROUND OF THE INVENTION

The invention relates to a vehicle pedal having a pedal bar and a pedal shaft which is connected to the latter in a rotationally fixed manner and on which bearing locations are provided.

Such vehicle pedals are used, for example, as gas pedals in motor vehicles. The pedal bar and the pedal shaft of known gas pedals are usually designed separately from one another as individual parts which are secured to one another in a rotationally fixed manner with the aid of an aluminum block and retaining pins. For this purpose, it is necessary for both the pedal shaft and the pedal bar to have bores for the insertion of the fastening pins. In addition, the operation of installing the two parts on one another involves high outlay. Either the pedal bar is fastened once the pedal shaft has been installed in its bearing locations, which is made difficult by the lack of free space, or the pedal bar is secured on the pedal shaft beforehand, which, if such an installation sequence is possible in the first place, results in it being much more difficult to install the pedal shaft in the bearing locations.

SUMMARY OF THE INVENTION

The object of the invention is to provide a vehicle pedal which is straightforward to produce and allows straightforward installation in its bearing locations.

The object is achieved according to the invention in that the pedal bar is integrally formed on the pedal shaft to the side of the two bearing locations.

With the aid of the vehicle pedal according to the invention, it is easily possible for the preassembled unit, comprising the pedal bar and pedal shaft, to be pushed into the bearing locations from one side. In addition, no space is required for the pedal bar between the bearing locations, with the result that the bearing locations themselves can easily be arranged in a freely selected manner and it is easily possible for further structural elements, e.g. a restoring spring for the gas pedal, to be arranged between the bearing locations.

The pedal bar may be welded laterally on the pedal shaft directly or via a connecting rod. A particularly preferred embodiment of the invention, however, provides for the pedal bar and the pedal shaft to be designed in one piece, the cross-sectionally circular pedal bar being angled essentially at right-angles at its end in order to form the pedal shaft. Such a unit, comprising the pedal bar and pedal shaft, can be produced in large numbers in a very straightforward and cost-effective manner. The circular cross-section of the pedal bar makes it possible for the pedal shaft to be mounted directly in bearing elements. If the unit comprising the pedal bar and pedal shaft is of non-circular cross-section, which is likewise conceivable in principle, additional elements with an annular outer surface have to be drawn onto the pedal shaft in the region of the bearing locations. In the transition region between the pedal bar and the pedal shaft, it is possible to provide a U-shaped angled portion, with the result that the imaginary extension of the pedal bar is located approximately in the central region of the pedal shaft. This results in the pedal bar being positioned in relation to the pedal shaft in the manner which is to be found in the case of known gas pedals.

The invention also relates to a gas-pedal module for mounting the above-described vehicle pedal. In the case of such a gas-pedal module, the invention provides for the two bearing locations of the pedal shaft to have bearings which are secured in bearing blocks arranged on a base plate.

Such an arrangement of the bearings in bearing blocks on a base plate, which may be formed, for example, cost-effectively from sheet metal, results in particularly low production costs for the entire module. In this case, it is possible for at least one bearing block to be designed in one piece with the base plate and/or for at least one bearing block to be welded on the base plate. In particular in comparison with bearing housings which involve high outlay to install, considerable savings are achieved by the base plate with the bearing blocks.

Preferably used as the bearings for the pedal shaft are flange bushings which are introduced in openings in the bearing blocks. Straightforward flange bushings made of plastic are usually sufficient, but flange bushings made of nonferrous metal or rolling-contact bearing are also conceivable where the requirements to be met are higher.

The task of securing the pedal shaft axially in relation to the bearings can usually be carried out by lock washers, and the embodiment of the invention which has proven expedient is one in which secured axially on the pedal shaft, between the outer flange bushing and the free end of said pedal shaft, is a lock washer which is supported axially, on one side, on the flange of the bushing and, on the other side, on a second lock washer, which is secured on the associated bearing block or on the base plate. With this arrangement, the installation of a single lock washer is sufficient in order to secure the pedal shaft axially in both directions.

In a further preferred embodiment of the invention, the free end of the pedal shaft is coupled in an axially disengageable manner to an angle-of-rotation sensor, for example such that the free end of the pedal shaft is slotted, and a claw element of the sensor engages in the slot.

In comparison with known couplings of the sensors, in the case of which a moveable part of the sensor, for example the slider of a potentiometer, was fixedly assigned to the pedal shaft, the above-described embodiment, in addition to straightforward installation, makes it possible for defective sensors to be exchanged quickly and cost-effectively. All that is required for this purpose is for the fastening elements of the sensor and the electrical connection of the latter to be released.

In the case of electronic gas pedals, it is usually desirable for the gas pedal, similar to the early type of cable-controlled systems, to have a force hysteresis. In the case of the above-described gas pedal, such a hysteresis can be achieved in a particularly straightforward and cost-effective manner in that a plastic sleeve is arranged between the bearing locations of the pedal shaft, in a rotationally fixed manner in relation to the base plate, and exerts a radial contact pressure on the circumferential surface of the pedal shaft. The resulting friction moment reduces the retaining forces of the pedal in the desired manner and thus improves the traveling comfort. The plastic sleeve can be installed without any significant increase in the installation outlay as the pedal shaft is plugged into the bearings. Since the pedal bar does not require any installation space between the two bearing locations, all the axial installation space between the bearing locations can be taken up by the plastic sleeve.

The plastic sleeve preferably has a contact-pressure spring which applies or increases the radial contact pressure.

The contact-pressure spring ensures that, even following a relatively long operating period, there is still sufficient contact pressure in order to produce the hysteresis. Although it is also possible, in principle, for the contact pressure to be achieved by an appropriately close fit of the inner bore of the sleeve, this may then result, during operation, in the friction moments changing, with the force hysteresis being influenced correspondingly.

In a preferred development, the plastic sleeve has at least one slot in the axial direction.

This slot is capable of taking up wear which is produced as a result of the contact pressure of the plastic sleeve on the pedal shaft and can influence the friction moment. A slotted plastic sleeve, which has for example an axial slot running over its entire length, also makes possible, in conjunction with the contact-pressure spring, a more specific application of a certain radial contact pressure.

A yet further preferred embodiment of the invention provides for the plastic sleeve, the sleeve-like contact-pressure spring of the latter and two restoring springs provided as helical springs which are subjected to torsion to be arranged concentrically around the pedal shaft. This makes it possible for all the essential functional elements of the gas pedal to be arranged in an extremely space-saving manner and, in addition, the gas pedal can continue to be installed by the straightforward plugging operation of the pedal shaft into the preassembled unit comprising the base plate, bearing bushings, plastic sleeve and restoring springs. The second restoring spring is necessary in order to achieve a redundant system which keeps sufficient emergency operating properties on standby if a restoring spring should fail.

Preferably arranged on the base plate is an angle which projects, as an idling stop, into the pivot path of the pedal bar. Such an angle can easily be riveted or welded on the base plate and can be formed in accordance with the individual vehicle conditions, in order to block the pedal travel at the desired location.

If required, there may also readily be arranged on the base plate a spring clip, of which the legs widen to receive between them the pedal bar in the kickdown position. The force which is necessary for widening the legs of the spring clip requires the gas pedal to be subjected to increased pressure, which signals to the driver that the kickdown position has been reached.

BRIEF DESCRIPTION OF THE DRAWINGS

Exemplary embodiments of the invention are discussed in more detail hereinbelow with reference to the attached drawings, in which.

DETAILED DESCRIPTION OF THE PREFERRED EMBODIMENT

Figure 1:
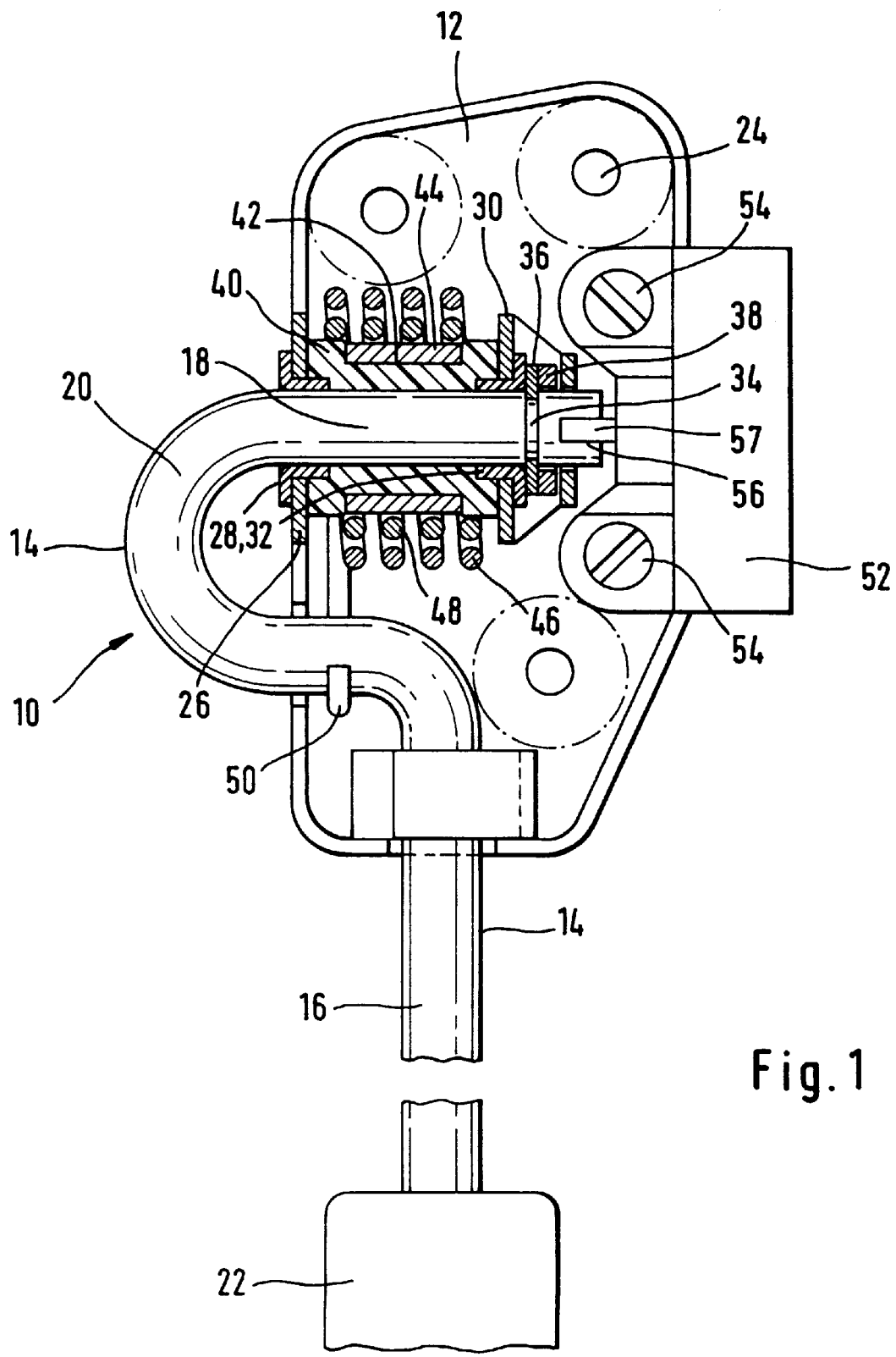
FIG. 1 shows a partially sectioned plan view of a gas-pedal module.

FIG. 1 illustrates a gas-pedal module 10 which essentially comprises a base plate 12 and a gas-pedal lever 14 which is mounted on the latter. The gas-pedal lever 14 is formed in one piece from a round-steel bar, which forms a pedal bar 16 at one end and a pedal shaft 18 at the other end, the bar region 16 and the shaft region 18 being connected to one another via an essentially U-shaped angled portion 20. The angled portion 20 is designed such that an imaginary extension of the pedal bar 16 is located approximately in the central region of the pedal shaft 18. A pedal plate 22 is welded at the free end of the pedal bar 16 and forms the surface which is subjected to the action of the driver's foot.

The base plate 12, which is fastened on the vehicle with the aid of three fastening holes 24, consists of a deep-drawn steel sheet with an integrated first bearing block 26 into which a first collar bearing 28 made of plastic is introduced for the purpose of mounting the pedal shaft 18. Furthermore, a second bearing block 30 is welded on the base plate 12, and said second bearing block has a second collar bearing 32 introduced into it for the purpose of mounting the pedal shaft 18. The pedal shaft 18 is provided, between its free end and the second collar bearing 32, with a circumferential groove 34 in which a lock washer 36 can be received. The lock washer 36 is supported, on one side, on the collar of the second collar bearing 32 and, on the other side, on a lock washer 38, which is secured on the housing. In this way, the installation of a single shaft-mounted lock washer secures the pedal shaft 18 axially in both directions.

A plastic sleeve 40 is secured axially between the two bearing blocks 26, 30 and has the pedal shaft 18 pushed into it when the latter is installed as it is plugged into the two collar bearings 28, 32. The plastic sleeve 40 serves as a friction partner for the pedal shaft 18 and, in order to enhance the radial contact pressure, has a contact-pressure spring 44 in the form of a contact-pressure spring 44 which is seated coaxially in a circumferential depression 42 in the outer surface of the plastic sleeve and is in the form of a spring-steel sleeve. The plastic sleeve 40, which can be installed without increased installation outlay when the pedal shaft 18 is installed in the collar bearings 28, 32, produces friction moments during pivoting of the gas-pedal lever 14 which result in a desirable hysteresis of the actuating force.

A first helical spring 46 of greater diameter and a second helical spring 48 of lesser diameter are arranged coaxially around the plastic sleeve 40. The two helical springs, which are subjected to torsional loading, are, with prestressing, secured in a guide (not shown) in the base plate 12, on one side, and, on the other side, fitted on the gas-pedal lever 14 via legs 50. The two helical springs 46, 48 serve as restoring springs for restoring the gas-pedal lever 14 in the direction of its idling position, the doubled arrangement of the springs ensuring a redundant system with emergency operating properties should one of the two springs fail. The two helical 46, 48 can also be easily installed before the pedal shaft 18 is pushed into the collar bearings 28, 32.

The free end of the pedal shaft 18 is in rotationally fixed connection with the moveable part of a sensor 52, which is installed on the base plate 12 with the aid of fastening screws 54. Provided, for this purpose, in the free shaft end is a slot 56 which intersects the axis of rotation of the pedal shaft 18 and in which there engages a corresponding claw element 57 which is connected, for example, to the slider of a potentiometer. The selected form-fitting engagement via the slot 56 makes it possible for the sensor 52 to be exchanged in a straightforward manner by the fastening screws 54 being released, without there being any need to release fastening elements on the shaft. The sensor 52 is connected electrically to a control device (not shown) which is intended for controlling a vehicle engine and to which the sensor transmits electric signals corresponding to the pedal position. Instead of the slot 56, other rotationally fixed connections between the pedal shaft 18 and the moveable part of the sensor 52 are also conceivable, for example elements with square studs or square sockets, toothing arrangements or the like.

Figure 4:
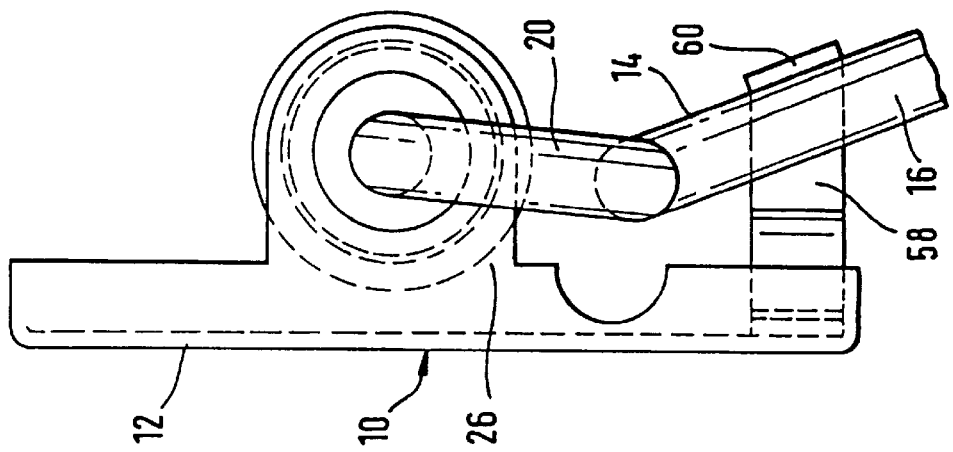
FIG. 4 shows a side view corresponding to FIG. 2 in the idling position of the gas pedal.

Also provided on the base plate 12 is a sheet-metal angle 58, of which the free angled leg 60 projects into the pivot path of the pedal bar 16. In this way, the leg 60 forms an idling stop for the gas-pedal lever 14, which positions itself against the leg 60 under the restoring force of the helical springs 46, 48 (see FIG. 4). The idling position can easily be adapted to individual vehicle types by way of correspondingly formed sheet-metal angles.

Figure 3:
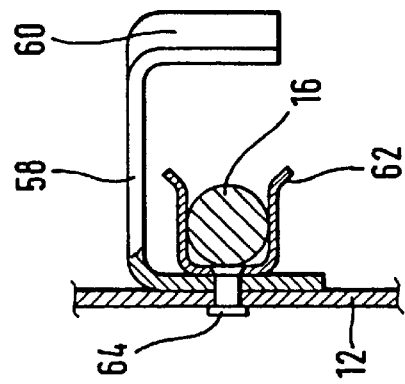
FIG. 3 shows a side view which has been rotated through 90° in relation to FIG. 2.
Figure 2:
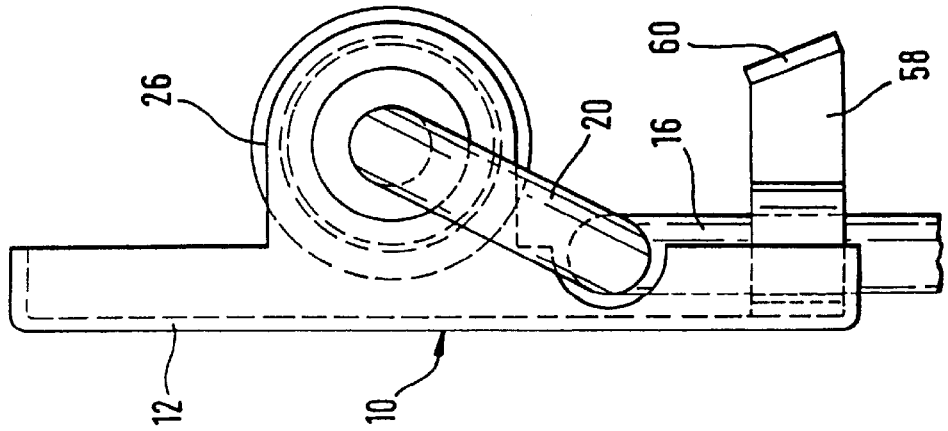
FIG. 2 shows a schematic side view of the gas-pedal module according to FIG. 1 in the full-load position.

Also secured on the base plate 12 is a spring clip 62, of which the legs enclose the pedal bar 16 in resilient abutment in the full-load position of the gas pedal (see FIGS. 2 and 3). This means that, in order to achieve the full-load position of the gas pedal, an increased pedal pressure is necessary, as is known, for example, in vehicles with automatic transmissions in the kickdown position. A kickdown switch can thus easily be simulated with the aid of the spring clip 62. Since the spring clip 62 is likewise located in the pivot plane of the pedal bar 16, the sheet-metal angle 58 and the spring clip 62 can be secured together on the base plate 12 with the aid of a single rivet 64. In the case of gas-pedal modules without a kickdown position, it is also possible for the sheet-metal angle 58 to be welded on the base plate 12.

Instead of the angled pedal lever 14 in the exemplary embodiment illustrated, it is also conceivable to have constructed variants in which the pedal bar 16 is welded laterally on the pedal shaft 18 via a connecting lever. This makes it possible to reduce the installation space of the gas-pedal module since the pedal lever 14 then no longer projects to such an extent beyond the base plate 12. However, additional installation steps are necessary in order to produce the gas-pedal lever 14 itself.

What is claimed is:

1. A vehicle pedal comprising a pedal bar (16) and a pedal shaft (18) said pedal bar (16) is connected to the pedal shaft (18) in a rotationally fixed manner and on said pedal shaft (18) two bearing locations (28, 32) are provided, wherein the pedal bar (16, 20) is integrally formed on the pedal shaft (18) to the side of the two bearing locations (28, 32), wherein the two bearing locations of the pedal shaft (18) have bearings (28, 32) which are secured in bearing blocks (26, 30) arranged on a base plate (12), wherein a plastic sleeve (40) is arranged between the bearing locations (28, 32) of the pedal shaft (18), in a rotationally fixed manner in relation to the base plate (12), and exerts a radial contact pressure on the circumferential surface of the pedal shaft (18), wherein the plastic sleeve (40) has at least one slot in axial direction.

2. A vehicle pedal comprising a pedal bar (16) and a pedal shaft (18) said pedal bar (16) is connected to the pedal shaft (18) in a rotationally fixed manner and on said pedal shaft (18) two bearing locations (28, 32) are provided, wherein the pedal bar (16, 20) is integrally formed on the pedal shaft (18) to the side of the two bearing locations (28, 32), wherein the two bearing locations of the pedal shaft (18) have bearings (28, 32) which are secured in bearing blocks (26, 30) arranged on a base plate (12), wherein at least one pre-stressed restoring spring (46, 48) is provided between the base plate (12) and the pedal bar (16), wherein a plastic sleeve (40), a sleeve-like contact-pressure spring (44) of the latter and two restoring springs formed as helical springs (46, 48) which are subjected to torsion are arranged concentrically around the pedal shaft (18).

3. A vehicle pedal comprising a pedal bar (16) and a pedal shaft (18) said pedal bar (16) is connected to the pedal shaft (18) in a rotationally fixed manner and on said pedal shaft (18) two bearing locations (28, 32) are provided, wherein the pedal bar (16, 20) is integrally formed on the pedal shaft (18) to the side of the two bearing locations (28, 32), wherein the two bearing locations of the pedal shaft (18) have bearings (28, 32) which are secured in bearing blocks (26, 30) arranged on a base plate (12), wherein arranged on the base plate (12) is a spring clip (62), of which legs widen to receive between them the pedal bar (16) in its kickdown position.

4. A vehicle pedal comprising a pedal bar (16) and a pedal shaft (18) said pedal bar (16) is connected to the pedal shaft (18) in a rotationally fixed manner and on said pedal shaft (18) two bearing locations (28, 32) are provided, wherein the pedal bar (16, 20) is integrally formed on the pedal shaft (18) to the side of the two bearing locations (28, 32), wherein the two bearing locations of the pedal shaft (18) have bearings (28, 32) which are secured in bearing blocks (26, 30) arranged on a base plate (12), wherein arranged on the base plate (12) is an angle (58, 60) which projects, as an idling stop, into pivot path of the pedal bar (16), wherein the angle (58) and a spring clip (62) are fastened together on the base plate (12) by a rivet (64).

* * * * *